W. GRACE.
FOUNTAIN BRUSH.
APPLICATION FILED MAR. 29, 1920.
1,362,937.
Patented Dec. 21, 1920.
2 SHEETS—SHEET 2.
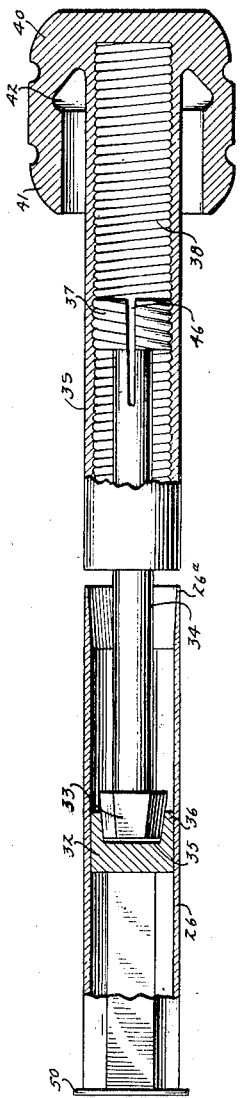
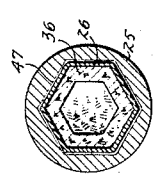
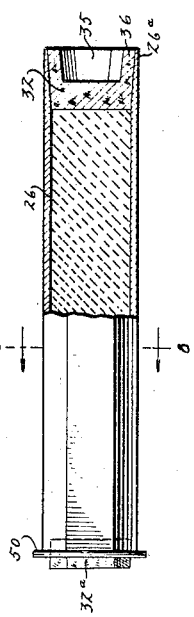
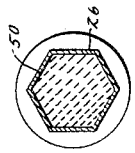
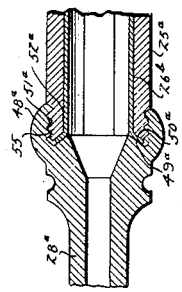
WITNESSES
INVENTOR
Walter Grace
BY
ATTORNEYS

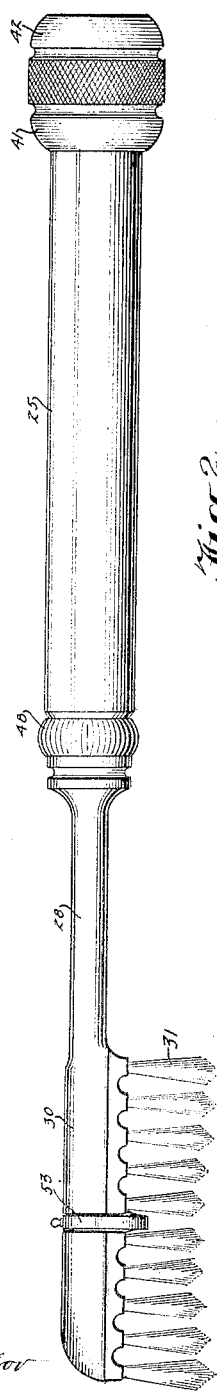

UNITED STATES PATENT OFFICE.

WALTER GRACE, OF AUCKLAND, NEW ZEALAND, ASSIGNOR TO FOUNTAIN TOOTH-BRUSHES LIMITED, OF AUCKLAND, NEW ZEALAND, A CORPORATION OF NEW ZEALAND.

FOUNTAIN-BRUSH.

1,362,937.    Specification of Letters Patent.    Patented Dec. 21, 1920.

Original application filed June 6, 1919, Serial No. 302,131. Divided and this application filed March 29, 1920. Serial No. 369,497.

*To all whom it may concern:*

Be it known that I, WALTER GRACE, a subject of the King of Great Britain, and a resident of Auckland, New Zealand, have invented a new and Improved Fountain-Brush, of which the following is a description.

My invention relates to a fountain brush and is adapted to be embodied in brushes for various purposes, such as toothbrushes, shaving brushes, shoebrushes, and the like.

More particularly the invention relates to a fountain brush involving a reservoir or container adapted to receive a replaceable refill cartridge containing plastic or other material to be delivered to the bristles through a hollow shank forming a conduit leading to the brush head, feed means being provided to cause the paste or other material to be extruded to the bristles as required.

The present application is a division of an application filed by me June 6, 1919, Serial Number 302,131. The invention of the present application consists in the novel refill cartridge and the combinations and subcombinations involving the same as particularly described hereinafter and defined in the claims.

In fountain brushes employing a refill cartridge insertible and removable through the rear end of the reservoir handle, the removal of the cartridge is exceedingly difficult owing to the forming of a vacuum in front of the forward end thereof due to an air tight closure at this point produced by the paste, and this objection I overcome by providing a separable joint between the forward end of the reservoir and the shank of the brush head, permitting the insertion and removal of the refill cartridge through the front end of the reservoir handle, whereby the vacuum opposing the removal of the refill cartridge is obviated, since in removing the cartridge through the front of the reservoir handle, after uncoupling the brush, there is no vacuum at the rear end of the cartridge; and the removal of the cartridge through the front of the handle is further facilitated by providing a refill cartridge of novel form as follows: A lateral flange is formed on the cartridge at the front end and is designed for several important purposes: First, to provide a finger-nail grip for the easy extraction of the empty cartridge; second, to provide through the clamping of the flange between the members of the joint referred to, for the secure clamping of the cartridge in a manner to prevent leakage of the paste around the forward end of the cartridge; and third, to provide a rigid locking of the cartridge against accidental longitudinal displacement under the pressure of the feed. Again, the refill cartridge which is a tubular holder having a throughbore is originally plugged at its opposite ends with cork or equivalent disks the front one of which is removed when the cartridge is positioned, while the rear cork serves as a follower to be advanced in the cartridge under the action of the feed means, and the rear cork is characterized by a distinctive form whereby the actuating feed device will exert a wedging action on the cork to press it closely against the walls of the cartridge as the cork is advanced, thereby preventing leakage rearwardly between the cork and the cartridge walls. Also, the rear cork and the rear end of the refill cartridge are correspondingly tapered so that when the cartridge is inserted in the reservoir for use and in case the cork has had time since leaving the factory to lose some of its elasticity so that it has more or less become molded to the size and shape of the interior of the cartridge, the action of the advancing feed device in forcing the cork still farther into the narrowing rear end of the cartridge, will additionally compress the cork and cause it to have a tighter fit to thereby contribute in preventing the possibility of leakage of the paste about the exterior of the cork.

Furthermore, my invention in its preferred embodiment is made to reflect important considerations with respect to the general assemblage, whereby convenience is promoted in assembling and disassembling the parts, the arrangement being such that the coupling of the detachable brush head shank to the reservoir securely clamps the cartridge in position and otherwise maintains the complete assemblage against accidental displacement of any of the parts, and similarly the detaching of the brush head shank from the reservoir permits of the complete disassembling of the parts for charging the reservoir with a new cartridge or for permitting a ready and effective cleansing of the parts.

Other characteristics and advantages of my improved construction will appear as the description proceeds.

Reference is to be had to the accompanying drawings forming a part of this specification, it being understood that the drawings are merely illustrative of practical examples of the invention.

Figure 1 is a side elevation of a toothbrush formed in accordance with the present invention;

Fig. 2 is a longitudinal sectional view thereof showing a filled cartridge and with the plunger in the extreme rearward position ready to be advanced into engagement with the cartridge;

Fig. 3 is a view partly in elevation and partly in section of the tubular handle constituting the reservoir of the brush;

Fig. 4 is a detail view partly in section and partly in elevation showing the coupling end of the brush-head shank adapted to be detachably connected with the tubular handle;

Fig. 5 is a detail view partly in section and partly in side elevation of the insertible cartridge and the feed means;

Fig. 6 is a cross section on the line 6—6, Fig. 2;

Fig. 7 is a partly sectional side elevation of the refill cartridge;

Fig. 8 is a cross section on the line 8—8, Fig. 7;

Fig. 9 is a fragmentary longitudinal sectional view showing a modification of the clamped end of the refill cartridge and clamp means therefor.

A reservoir handle is provided consisting in the illustrated example of an outer shell 25 which receives in its forward portion a refill cartridge 26 from which the material by feed means hereinafter described is discharged through a longitudinal duct 27 in the shank 28 of a brush head designated generally by the numeral 30, there being a lateral branch passage 29 discharging to the bristles 31.

The refill cartridge 26 consists of a tube preferably of celluloid, xylonite, or similar material filled with the toothpaste or other material and adapted to be vended as a separate commodity. The rear end of the cartridge is closed by a cork plug 32 and the forward end by a cork or disk 32ᵃ, the latter being adapted to be removed and discarded when the cartridge is placed in the brush. The rear cork 32 is adapted to be advanced by the feed means and arranged to act as a follower for the paste as it is pushed forwardly in the cartridge 26.

The feed means in the form shown includes a head 33 on a plunger rod 34, said head advantageously being tapered and adapted to be received in a tapering recess 35 in the rear face of the cork 32, said recess producing a surrounding flange 36 which is adapted by the wedging action of the tapered head 33 to be pressed firmly outward against the walls of the shell 26 to thereby insure a tight closure of the shell and prevent leakage of the paste or the like rearwardly between the cork and shell. Also, the rear end of the shell of the refill cartridge 26 is beveled as at 26ᵃ so as to prevent at the rear end a forwardly convergent interior, the purpose of which is to insure compression of the cork 32. Thus, as seen best in Fig. 2, the cork 32 at its flange portion 36 or rear end will, when in place, flare in correspondence with the taper 26ᵃ. Therefore, if, after the cartridge has been vended, any material time has elapsed and the cork become more or less hardened or set, the action of the feed means in forcing the cork forwardly into the shell 26 will compress the rear end by forcing the same into the narrow bore of the cartridge.

The rear end 37 of the plunger rod 34 is enlarged and provided with external threads as indicated at 37 which engage internal threads on a feed barrel 39 receivable in the tubular handle 25 rearwardly of the refill cartridge 26. On the feed barrel 39 is a head 40 constituting a cap for the handle 25, said head having an annular flange or skirt 41 embracing said handle at the rear end. The skirt is spaced laterally outward from the barrel 39 so as to accommodate the rear end of the handle 25. The interior of the skirt 41 has an annular groove 42 which receives the beveled bead 43 formed annularly on the barrel 25 at its extreme rear end. The rear end of the barrel 25 as best seen in Fig. 3 is slotted longitudinally, the slots extending through the bead 43 whereby said rear end is made resilient and is adapted to spring into place in a manner for the bead 43 to engage in the groove 42. Similarly, the rear end of the handle will yield to a rearward pull on the cap 40 so that the skirt 41 may slip over the bead 43 in removing the feed barrel and plunger rod from the handle. The plunger rod 34 is slotted longitudinally at its rear end, the slots extending through the threaded, enlarged terminal 37 and into the shank as best seen in Fig. 2, whereby the rear end of the plunger is resilient so that the front end may be placed against a table or any surface affording a resistance, so that pressure exerted forwardly on the cap 40 will cause the threaded feed barrel 39 to slip over the threads 37, thereby giving a quick return of the plunger rod to the rearward position for another operation. The threads 37, 38 in practice have a pitch such that one turn of the cap 40 will cause a sufficient quantity of the paste or the like to be extruded to answer for a single service. To prevent the plunger rod 34 turning with the cap 40 and said rod thus kept from feeding, I provide an interengagement between said rod and a part appurtenant to the refill cartridge for which purpose in the form of the invention shown in Figs. 1 to 6 the head 33 is made polygonal or otherwise non-circular in cross section and a corresponding formation is provided in the cork 32, the interior of the depression 35 being thus made to conform to the cross section of the head 33. Thus there can be no turning of the head 33 relatively to the cork 32. Similarly, the cork 32 is prevented from turning in the refill cartridge by being made non-circular in cross section the cartridge corresponding interiorly, and said cartridge is hexagonal for example or otherwise non-circular exteriorly and conforms to a similar formation in the interior of the handle 25 as indicated at 47. Figs. 3 and 6. Thus, the plunger rod 34 when its head 33 is engaged in the recess 35 of the cork 32 can have no turning movement and hence the turning of the cap 40 and the feed barrel 39 will necessarily cause an advance of the plunger rod for feeding the material. The described feed means is not claimed herein, the same forming the subject matter of my aforenamed application.

The shank 28 of the brush head 30 is formed at its rear end with a coupling member 48 of socket form internally threaded as at 51 and at the base of said member is an annular seat 49 which is adapted to accommodate a lateral, outwardly directed annular flange 50 on the adjacent end of the refill cartridge 26, while the threads 51 are adapted to take onto the external threads of a coupling member 52 formed on the rear end of the handle 25. The arrangement is such that the connection effected between the rear end of the brush shank 28 and the adjacent end of the tubular handle serves to effectively secure the refill cartridge against longitudinal displacement under the pressure of the feed against the rear end of the cartridge. The flange 50 moreover is clamped between the seat 49 and the adjacent end of the handle 25 and not only is the cartridge securely held but the leakage of paste about the flange 50 and rearwardly along the cartridge between the same and the walls of the reservoir is effectively prevented. In addition, the further important result is obtained, that when the cartridge is finally emptied of its contents, and the shank 28 is detached from the handle the flange 50 of the refill cartridge constitutes a finger-hold for readily removing the empty cartridge from the handle. Furthermore, no vacuum is present opposing the removal of the cartridge.

In the form shown in Fig. 9 a flange 50$^a$ on the shell of the refill cartridge 26$^b$ is accommodated on a correspondingly tapered seat 49$^a$ formed on the shank 28$^a$ of the brush head. Said shank has a threaded flange 48$^a$, the threads 51$^a$ of which engage the externally threaded end 52$^a$ on the tubular handle 25$^a$ and the end of said handle engaging the flaring flange 50$^a$ is made correspondingly conical. The arrangement, like that first described, tends to insure a tight joint at the flange 50$^a$, affords a finger-nail grip, and effectively clamps the cartridge in position.

The band 53 for controlling the outlet 29 does not form part of the invention claimed herein.

It will be seen that when the external coupling member 48 is uncoupled the flange 50 of the cartridge lies outside of and against the end of the reservoir 25 and is readily accessible so that its character as a finger-hold may be available of for the easy extraction of the empty cartridge from which the intimate relation between said flange and the coupling means will be readily understood.

I would state in conclusion that while the illustrated examples constitute practical embodiments of my invention, I do not limit myself strictly to the mechanical details herein illustrated, since manifestly the same can be considerably varied without departure from the spirit of the invention as defined in the appended claims.

Having thus described my invention, I claim—

1. In a device of the class described, the combination with a reservoir, feed means including a plunger for extruding the contents of the reservoir, and a brush to which the extruded material is delivered, of coupling means forming a detachable connection between the brush and the forward end of the reservoir, and a cartridge receivable in said reservoir through the front end of which cartridge the material, under the action of said plunger, may escape to the brush, said cartridge having an annular flange thereon at the front end, said coupling means serving to clamp said flange between the members thereof to prevent leakage, under the feed pressure, around the forward end of the cartridge, said flange constituting a fingernail-grip and accessible as such when said coupling means are uncoupled to assist in the extraction of the empty cartridge.

2. A fountain brush including a tubular handle element, a refill cartridge removably receivable therein and formed with a lateral flange at an end thereof, a brush head having a shank and formed with a discharge duct communicating with the cartridge, said shank having a seat receiving said flange, a coupling member on said shank adjacent to said seat, and a coacting coupling member on the adjacent end of said handle element, the connection of said coupling members serving to clamp said flange on said seat; said seat being conical and said flange and the end of the handle element being correspondingly flaring.

3. A fountain brush including a tubular element, a brush connected with said tubular element and having a passage communicating therewith, a refill cartridge receivable in said tubular element and adapted to discharge to said passage, a rear closure in said cartridge adapted to constitute a follower, and having a rearwardly flaring recess in its rear face, feed means including a plunger longitudinally movable through said cartridge, the front end of said plunger being engageable in said recess and tapered to expand the follower against the walls of the cartridge.

4. For use in a fountain brush having a reservoir for material to be discharged as required; a container for said material open at both ends, the rear end of said container presenting a rearwardly flaring interior, and a closure for said rear end of the container adapted to be advanced in the latter to constitute a follower in discharging the material, said flaring portion of the cartridge serving to compress the closure as the latter is forced therethrough.

5. For use in a fountain brush having a reservoir for material to be discharged as required, a container for said material open at both ends, and a closure for the rear end of the container, said closure having a rearwardly flaring recess in its rear face adapted to receive the end of a tapered plunger for expanding the wall of said recess against the walls of the cartridge.

6. For use in a fountain brush having a reservoir, for material to be discharged as required and having separable elements; a container for said material open at both ends, said container having a lateral flange at the forward end thereof constituting a finger-nail grip for the removal of the cartridge from the reservoir when emptied and adapted to be clamped between the joint formed by the said elements of the brush.

WALTER GRACE.